United States Patent [19]

Kaneko

[11] Patent Number: 5,817,222
[45] Date of Patent: Oct. 6, 1998

[54] RARE EARTH METAL-NICKEL HYDROGEN STORAGE ALLOY, PROCESS FOR PRODUCING THE SAME, AND ANODE FOR NICKEL-HYDROGEN RECHARGEABLE BATTERY

[75] Inventor: Akihito Kaneko, Kobe, Japan

[73] Assignee: Santoku Metal Industry Co., Ltd., Kobe, Japan

[21] Appl. No.: 750,996

[22] PCT Filed: Apr. 3, 1996

[86] PCT No.: PCT/JP96/00916

§ 371 Date: Nov. 27, 1996

§ 102(e) Date: Nov. 27, 1996

[87] PCT Pub. No.: WO96/31633

PCT Pub. Date: Oct. 10, 1996

[30] Foreign Application Priority Data

Apr. 3, 1995 [JP] Japan ........................................ 7-99456
Sep. 18, 1995 [JP] Japan ........................................ 7-262035

[51] Int. Cl.$^6$ .............................. H01M 4/38; C22C 19/03
[52] U.S. Cl. .......................... 204/293; 148/403; 148/426; 148/427; 148/428; 148/429; 148/538; 148/442; 148/555; 148/561; 164/463; 164/479; 164/480; 429/59; 429/223
[58] Field of Search ............................ 148/403, 426–429, 148/442, 538, 555, 556, 561; 164/479, 480, 463; 204/293; 420/900; 429/59, 101, 223

[56] References Cited

U.S. PATENT DOCUMENTS 4,660,622  4/1987  Reutler et al. ............................ 164/479
5,470,404  11/1995 Yamamoto et al. ....................... 420/900
5,496,424  3/1996  Fujitani et al. ........................... 420/900
5,512,385  4/1996  Komori et al. ........................... 429/101
5,629,000  5/1997  Matsuura et al. .......................... 429/59
5,654,115  8/1997  Hasebe et al. ............................. 429/59

FOREIGN PATENT DOCUMENTS 4-190959  7/1992  Japan ...................................... 148/555
6-306413 A  11/1994  Japan .

*Primary Examiner*—Margery Phipps
*Attorney, Agent, or Firm*—Darby & Darby

[57] ABSTRACT

A rare earth metal-nickel hydrogen storage alloy having a composition represented by the formula (1)

$$RNi_{x-y}M_y \qquad (1)$$

(wherein R stands for La, Ce, Pr, Nd, or mixtures thereof, M stands for Co, Al, Mn, Fe, Cu, Zr, Ti, Mo, Si, V, Cr, Nb, Hf, Ta, W, B, C, or mixtures thereof, x satisfies the formula of $3.5 \leq x < 5$, and y satisfies the formula of $0 < y \leq 2$, crystals in the alloy having a LaNi$_5$ type single phase structure, the alloy including in an amount of not less than 5 volume % and less than 95 volume % thereof crystals each containing not less than 2 and less than 17 antiphase boundaries extending perpendicular to C-axis of a grain of the crystal in the alloy per 20 nm along the C-axis, a method of producing the same, and an anode for a nickel hydrogen rechargeable battery containing as an anode material the above rare earth metal-nickel hydrogen storage alloy and an electrically conductive material. This anode can improve the initial activity, the battery capacity, and the battery life at the same time.

8 Claims, 1 Drawing Sheet

A

RARE EARTH METAL-NICKEL HYDROGEN STORAGE ALLOY, PROCESS FOR PRODUCING THE SAME, AND ANODE FOR NICKEL-HYDROGEN RECHARGEABLE BATTERY

SPECIFICATION

1. Field of Art

This invention relates to a rare earth metal-nickel hydrogen storage alloy which achieves high capacity and long battery life when it is used for a hydrogen storage vessel, a heat pump, or as an anode material for a nickel-hydrogen rechargeable battery, a process for producing the same, and an anode for a nickel-hydrogen rechargeable battery.

2. Background of the Invention

An anode for a nickel-hydrogen rechargeable battery which is currently produced in a large amount is mainly produced with an $AB_5$ type alloy which has La, Ce, Pr, Nd, or a mixture of these elements (misch metal) in A-site, and Ni, Co, Mn, and/or Al in B-site (referred to as "$LaNi_5$ type" in the present specification). This alloy has the properties of larger hydrogen storage capacity than other alloy, and a usable hydrogen absorption-desorption pressure of 1 to 5 atmosphere at ordinary temperature.

The conventional rare earth metal-nickel alloy of $LaNi_5$ type structure, however, exhibits low initial activity in absorbing hydrogen, so that several cycles to several ten cycles of hydrogen absorption and desorption are required at the initial stage for achieving 100 % hydrogen storage capacity. Further, this alloy has drawbacks of expanding and contracting due to the absorption and desorption of hydrogen, thereby generating cracks and being decrepitated to deteriorate the properties of the battery.

Alternatively, electrodes for achieving still larger battery capacity are recently demanded, and an alloy has been developed having a composition wherein the ratio of transition metals containing nickel as a main component to rare earth metals is decreased in order to increase the capacity of the battery. However, this alloy achieves an increased battery capacity at a sacrifice of long battery life.

As mentioned above, the rare earth metal-nickel hydrogen storage alloy used as an anode material for a nickel-hydrogen rechargeable battery has hitherto been required to have more capacity and longer life.

In order to prolong the life, for example, there is proposed a method of increasing the content of Co or the like, or a method of subjecting the alloy itself to a heat treatment to clear compositional segregation and to relieve strain generated in casting, but either of the methods result in decreased battery capacity. On the other hand, when the content of Mn is increased to enhance the capacity, the long life is sacrificed. Therefore, an alloy which achieves high initial activity and long life at the same time, and further high battery capacity when it is used as an anode for a nickel-hydrogen rechargeable battery, is not known.

As stated above, with the conventional nickel-hydrogen rechargeable battery of $LaNi_5$ type structure, composition has mainly been discussed. However, the properties of an alloy also depend on a crystal state, a crystal distribution, or the like from more detailed point of view. Thus, the effects of the crystal state or the like on the properties of an alloy has recently been attracting attention.

It is hitherto known that an alloy having $Ce_2Ni_7$ or $CeNi_3$ structure contains antiphase boundaries. The antiphase boundary is a boundary face between a normal phase and an antiphase area wherein the arrangement of atoms on a sublattice is inverted, in a superlattice structure with incomplete regularity in the arrangement of the component atoms (*Dictionary of Physics*, small edition, published by Kabushiki Kaisha Baifukan, Oct., 20, 1986, pp.439–440).

However, it is not known that the antiphase boundaries exist in a $LaNi_5$ type structure, nor is known the effect of such antiphase boundaries. Therefore, it is not at all known to apply this structure for improving the properties of a hydrogen storage alloy.

As a method for producing a rare earth metal-containing alloy, there is conventionally known a method utilizing a roll casting device having s single roll or double rolls, wherein a rare earth metal-containing alloy melt is supplied on the surface of the roll, and rapidly quenched with the cooling rate being controlled. In a generally used roll casting device, which may be used for producing an amorphous material or the like, the roll surface merely has the surface roughness of several micrometers or less in the maximum height ($R_{max}$), or the roll surface is almost a mirror surface.

DISCLOSURE OF THE INVENTION

It is an object of the present invention to provide a rare earth metal-nickel hydrogen storage alloy and a method for producing the same which can improve the initial activity, the battery capacity, and the battery life all at the same time when it is used for an anode of a nickel-hydrogen rechargeable battery, as compared to the conventional rare earth metal-nickel hydrogen storage alloy which can be used as an anode material for a nickel-hydrogen rechargeable battery.

It is another object of the present invention to provide an anode for a nickel-hydrogen rechargeable battery which achieves high initial activity, high battery capacity, and long battery life at the same time.

The present inventors have found out that antiphase boundaries, which have not been recognized in a crystal with $LaNi_5$ type structure, can be formed in a crystal with $LaNi_5$ type structure having the specific composition as will be described later, that the specific distribution or the like of the antiphase boundaries causes improvement in the initial activity for effecting hydrogen absorption and desorption, and that the antiphase boundaries favorably affects the functions to prevent decrepitation due to the absorption and desorption of hydrogen. It is believed that the presence of such antiphase boundaries favorably affects the hydrogen absorption-desorption properties because rare earth elements are arranged along the antiphase boundaries, through which hydrogen can easily be transferred. The inventors have further found out that an alloy having crystals with $LaNi_5$ type structure containing the specific antiphase boundaries therein can be obtained by supplying an alloy melt with the specific composition on a roll with the specific surface roughness under the specific cooling conditions to cast into an alloy having the specific thickness.

According to the present invention, there is provided a rare earth metal-nickel hydrogen storage alloy having a composition represented by the formula (1):

$$RNi_{x-y}M_y \qquad (1)$$

wherein R stands for La, Ce, Pr, Nd, or mixtures thereof, M stands for Co, Al, Mn, Fe, Cu, Zr, Ti, Mo, Si, V, Cr, Nb, Hf, Ta, W, B, C, or mixtures thereof, x satisfies the formula of $3.5 \leq x < 5$, and y satisfies the formula of $0 < y \leq 2$ (referred to as composition A hereinbelow), crystals in said alloy having a $LaNi_5$ type single phase structure, said alloy including in an amount of not less than 5 volume % and less than 95 volume % thereof crystals each containing not less than 2 and less than 17 antiphase boundaries extending perpendicular to C-axis of a grain of said crystal in the alloy per 20 nm along the C-axis.

According to the present invention, there is also provided a method for producing the rare earth metal-nickel hydrogen storage alloy as mentioned above comprising the step of uniformly solidifying an alloy melt having the composition A represented by the above formula (1) to have a thickness of 0.1 to 2.0 mm under cooling conditions wherein a supercooling degree is 50° to 500° C. and a cooling rate is 1000° to 10000° C./sec. using a roll casting device having a roll with a surface roughness of 30 to 150 $\mu$m in mean maximum height ($R_{max}$), and preferably, after the solidification, the step of heating the solidified alloy at 800° to 1000° C. for 0.1 to 12 hours in vacuum or in an inert atmosphere.

According to the present invention, there is further provided an anode for a nickel-hydrogen rechargeable battery containing as an anode material the rare earth metal-nickel hydrogen storage alloy as mentioned above and an electrically conductive material.

BEST MODE FOR CARRYING OUT THE INVENTION

Figure 1:
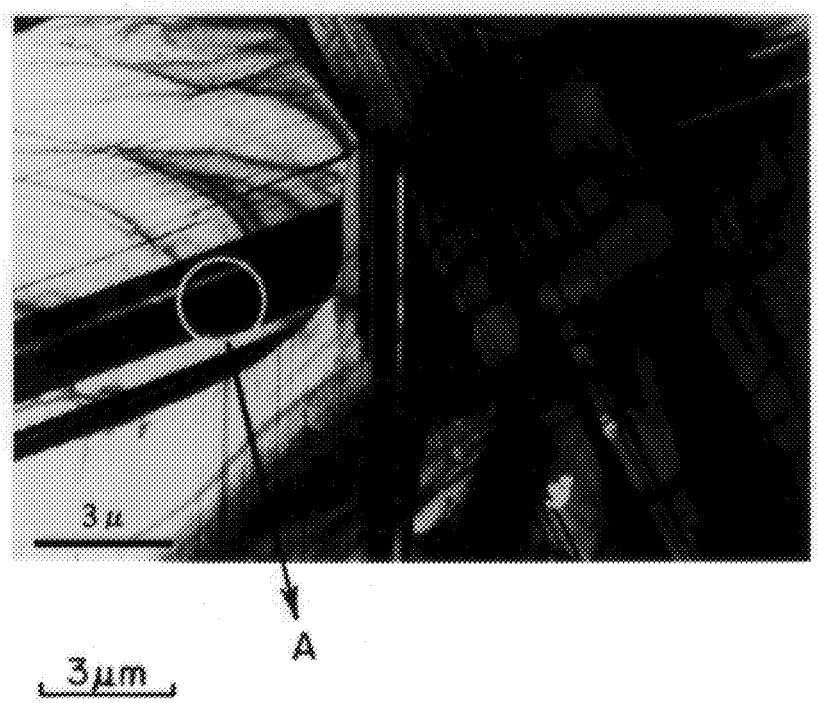
FIG. 1 is a photograph taken by a high-resolution transmission electron microscope for determining the content of the crystal grains containing antiphase boundaries therein in an ingot in the form of a ribbon prepared in Example 1.

The hydrogen storage alloy of the present invention is a rare earth metal-nickel hydrogen storage alloy which has the composition A represented by the formula (1) above, of which crystals have a LaNi$_5$ type single phase structure, and which includes in an amount of not less than 5 volume % and less than 95 volume % thereof crystals each containing not less than 2 and less than 17 antiphase boundaries extending perpendicular to the C-axis of a grain of the crystal in the alloy per 20 nm along the C-axis. If the content of the crystals each containing not less than 2 and less than 17 antiphase boundaries extending perpendicular to the C-axis of a grain of the crystal in the alloy per 20 nm along the C-axis is less than 5 volume %, the initial activity is declined, while if it is 95 volume % or more, the battery life is shortened when the alloy is used for an anode of a nickel-hydrogen rechargeable battery.

It can be identified that the crystal structure of the alloy is a LaNi$_5$ type single phase structure, for example, by creating and analyzing an ordinary X-ray diffraction pattern. Further, the antiphase boundaries maybe determined by introducing electron beam from [100] axis of a crystal grain of the alloy, taking a high resolution image of (100) plane thereof under the magnification of 300000 or more using a high resolution transmission electron microscope with the accelerating voltage of 200 kV or more, and measuring the number of the antiphase boundaries per unit length along the direction of the C-axis (direction of [001]). Also, the content of the crystal grains containing the antiphase boundaries may be determined by taking an image of the (100) plane of a crystal grain by a transmission electron microscope with the accelerating voltage of 200 kV or more under the magnification of 10000 to 50000, and measuring the surface ratio of the crystals containing the antiphase boundaries.

In the above formula (1), when R is 1, x satisfies the formula of $3.5<x\leq 5$, preferably $3.8\leq x\leq 4.9$, and y simultaneously satisfies the formula of $0<y\leq 2$, preferably $1.0\leq y\leq 1.8$. If x is less than 3.50, the battery life is shortened, while if x is 5 or more, the antiphase boundaries are not formed. When M in the formula (1) is more than 2, the surface activity is lowered, and the hydrogen storage capacity is decreased.

In the composition A, R in the formula can be one or more elements selected from the rare earth metals including La, Ce, Pr, and Nd. When two or more elements are combined, the content of each element may preferably be selected so that the content of La is 20 to 60 atm. %, the content of Ce is 0 to 60 atm. %, the content of Pr is 0 to 50 atm. %, and the content of Nd is 0 to 50 atm %. Alternatively, misch metal can be used as the starting material.

In the formula (1), M may stand for one kind of metal or a combination of two or more kinds of metals. Two or more kinds of metals may suitably be combined depending on the properties of each metal. Specifically, Co has effects of expanding the lattice of crystals to lower the equilibrium pressure of hydrogen, and of preventing decrepitation to improve the battery life. The mixing ratio of Co to R in the formula is preferably 0.01 to 1.0 : 1, more preferably 0.02 to 0.8 : 1 in atomic ratio (the mixing ratio of other elements will be described on this basis hereinbelow).

Al has effects of expanding the lattice of crystals to lower the equilibrium pressure of hydrogen, and of increasing the hydrogen storage capacity. The mixing ratio of Al is preferably 0.1 to 1.0, more preferably 0.2 to 0.3 in atomic ratio.

Mn has effects of expanding the lattice of crystals to lower the equilibrium pressure of hydrogen, and of increasing the hydrogen storage capacity. The mixing ratio of Mn is preferably 0.1 to 1.0, more preferably 0.2 to 0.6 in atomic ratio.

Fe has effect of activating the surface of the alloy to accelerate the hydrogen absorption-desorption rate. The mixing ratio of Fe is preferably not more than 0.1, more preferably 0.01 to 0.03 in atomic ratio.

Cu has an effect of expanding the lattice of crystals to lower the equilibrium pressure of hydrogen. The mixing ratio of Cu is preferably 0.01 to 1.0, more preferably 0.05 to 0.5 in atomic ratio.

Zr has effects of improving the hysterisis properties of PCT curve (hydrogen pressure-composition isotherms), and of improving the battery life by precipitating at the grain boundaries to prevent cracking. The mixing ratio of Zr is preferably not more than 0.1, more preferably 0.01 to 0.03 in atomic ratio.

Ti has an effect of improving the hysterisis properties of PCT curve. The mixing ratio of Ti is preferably not more than 0.1, more preferably 0.01 to 0.03 in atomic ratio.

Mo has effects of improving the activity, and of accelerating the hydrogen absorption-desorption rate. The mixing ratio of Mo is preferably not more than 0.1, more preferably 0.01 to 0.03 in atomic ratio.

Si has an effect of lowering the equilibrium pressure of hydrogen. The mixing ratio of Si is preferably 0.03 to 1.0, more preferably 0.05 to 0.2 in atomic ratio.

V has an effect of facilitating formation of the antiphase boundaries. The mixing ratio of V is preferably 0.01 to 0.5, more preferably 0.03 to 0.1 in atomic ratio.

Cr has an anti-cracking effect. The mixing ratio of Cr is preferably 0.01 to 0.5, more preferably 0.1 to 0.3 in atomic ratio.

Nb has an anti-cracking effect. The mixing ratio of Nb is preferably 0.01 to 0.1, more preferably 0.03 to 0.05 in atomic ratio.

Hf has an effect of improving the hysterisis properties. The mixing ratio of Hf is preferably not more than 0.1, more preferably 0.01 to 0.03 in atomic ratio.

Ta has an effect of improving the hysterisis properties. The mixing ratio of Ta is preferably 0.01 to 0.1, more preferably 0.03 to 0.05 in atomic ratio.

W has effects of improving the activity, and of accelerating the hydrogen absorption-desorption rate. The mixing ratio of W is preferably not more than 0.1, more preferably 0.01 to 0.03 in atomic ratio.

B has effects of improving the activity, and of accelerating the hydrogen absorption-desorption rate. The mixing ratio of B is preferably not more than 0.1, more preferably 0.01 to 0.03 in atomic ratio.

C has an effect of accelerating the hydrogen absorption-desorption rate. The mixing ratio of C is preferably not more than 0.1, more preferably 0.01 to 0.03 in atomic ratio.

The hydrogen storage alloy of the present invention may contain impurities which is inevitably contained in each of the starting materials of the composition A, or during the manufacturing process of the hydrogen storage alloy.

Specific examples of the composition A represented by the formula (1) may preferably include the following alloy compositions:

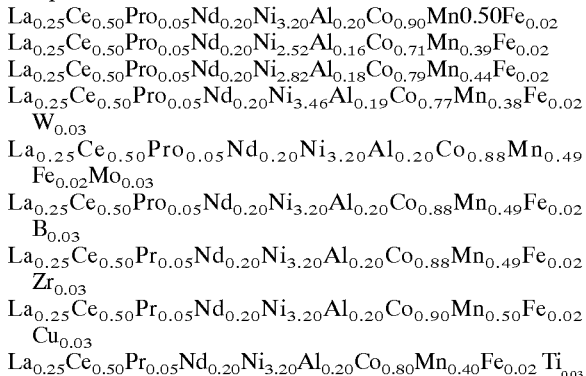

$La_{0.25}Ce_{0.50}Pr_{0.05}Nd_{0.20}Ni_{3.20}Al_{0.20}Co_{0.90}Mn_{0.50}Fe_{0.02}$ $La_{0.25}Ce_{0.50}Pr_{0.05}Nd_{0.20}Ni_{2.52}Al_{0.16}Co_{0.71}Mn_{0.39}Fe_{0.02}$ $La_{0.25}Ce_{0.50}Pr_{0.05}Nd_{0.20}Ni_{2.82}Al_{0.18}Co_{0.79}Mn_{0.44}Fe_{0.02}$ $La_{0.25}Ce_{0.50}Pr_{0.05}Nd_{0.20}Ni_{3.46}Al_{0.19}Co_{0.77}Mn_{0.38}Fe_{0.02}W_{0.03}$ $La_{0.25}Ce_{0.50}Pr_{0.05}Nd_{0.20}Ni_{3.20}Al_{0.20}Co_{0.88}Mn_{0.49}Fe_{0.02}Mo_{0.03}$ $La_{0.25}Ce_{0.50}Pr_{0.05}Nd_{0.20}Ni_{3.20}Al_{0.20}Co_{0.88}Mn_{0.49}Fe_{0.02}B_{0.03}$ $La_{0.25}Ce_{0.50}Pr_{0.05}Nd_{0.20}Ni_{3.20}Al_{0.20}Co_{0.88}Mn_{0.49}Fe_{0.02}Zr_{0.03}$ $La_{0.25}Ce_{0.50}Pr_{0.05}Nd_{0.20}Ni_{3.20}Al_{0.20}Co_{0.90}Mn_{0.50}Fe_{0.02}Cu_{0.03}$ $La_{0.25}Ce_{0.50}Pr_{0.05}Nd_{0.20}Ni_{3.20}Al_{0.20}Co_{0.80}Mn_{0.40}Fe_{0.02}Ti_{0.03}$

In the method for producing the hydrogen storage alloy of the present invention, a mixture of the starting metal materials mixed to have the composition A is melted, and the obtained alloy melt is uniformly solidified to have a thickness of 0.1 to 2.0 mm under the cooling conditions wherein the supercooling degree is 50° to 500 °C. and the cooling rate is 1000° to 10000 °C./sec., preferably 3000° to 10000° C./sec. using a roll casting device having a roll with the particular surface roughness.

In this case, the supercooling degree refers to a value obtained by subtracting the actual temperature of the alloy melt below the melting point from the melting point of the alloy (i.e. (melting point of the alloy)—(actual temperature of the alloy melt below the melting point). In detail, "supercooling" is a phenomenon wherein an alloy melt is not actually solidified even when it is cooled down to the melting point of the alloy, but when the temperature of the alloy melt is further declined to reach the nucleation temperature, fine solid phases or crystals are formed in the alloy melt to cause solidification of the alloy melt for the first time. The supercooling degree may be controlled by, for example, controlling the temperature of the alloy melt prepared by using a crucible or the like and suitably adjusting the time and speed for transferring the alloy melt to a single roll for solidification. If the supercooling degree and the cooling rate is outside the above requisite range, an alloy having the $LaNi_5$ type single phase structure wherein the desired antiphase boundaries are generated cannot be obtained.

On the other hand, the above mentioned roll casting device is a device which has a single roll or double rolls on the surface of which an alloy melt is cooled and solidified. In the roll casting device, the surface roughness of the roll is defined by the mean value of the maximum height ($R_{max}$), i.e. the mean maximum height ($R_{max}$), of the irregularity of the roll surface, in other words, the mean maximum height ($R_{max}$) of the contour of the cross section of the roll taken along a plane perpendicular to the plane to be measured. The mean maximum height ($R_{max}$) is an average value of the maximum heights ($R_{max}$) taken at a plurality of locations over 8 mm unit of the roll surface having irregularities, as specifically defined by JIS B0601 (1976). In the method of the present invention, an alloy melt is cooled and solidified using a roll having the surface roughness defined by the mean maximum height ($R_{max}$) of 30 to 150 μm, preferably 60 to 120 μm. Other criteria for expressing the surface roughness as defined in JIS B0601 (1976) are also known, such as ten point mean roughness ($R_z$) and center line average roughness ($R_a$), but in the method of the present invention, the surface roughness as defined by the mean value of the maximum heights ($R_{max}$) is adopted.

The above mentioned mean maximum height ($R_{max}$) may be determined by a commercially obtainable stylus type or laser sensor type surface roughness measuring device according to JIS B0601 (1976). The above mentioned surface roughness may be given to a roll by grinding the roll with a grinder having a selected type and a particle size (grade) of abrasive grains used for polishing the roll, a rotary disk, or the like.

The mechanism has not yet been solved thoroughly of the capability of obtaining the specific antiphase boundaries in the $LaNi_5$ type single phase structure, which is the structural feature of the hydrogen storage alloy of the present invention, by using a roll casting device having a roll with the controlled surface roughness. However, if the mean maximum height ($R_{max}$) is less than 30 μm, the number of the crystal nuclei generated is small, and as a result, the structure of the obtained alloy becomes two phase structure composed of crystal grains with $LaNi_5$ type structure and crystal grains with $Ce_2Ni_7$ type structure, and the $LaNi_5$ type single phase structure cannot be obtained. On the other hand, if the mean maximum height ($R_{max}$) is more than 150 μm, the solidified alloy flakes have poor peeling properties from the roll, and thus an alloy cannot substantially be produced. The method for producing the hydrogen storage alloy of the present invention is not limited to the method of the present invention using the roll casting device. It is believed that the hydrogen storage alloy of the present invention may be obtained by cooling and uniformly solidifying an alloy melt having the above mentioned composition A into the particular thickness under the aforementioned cooling conditions by using a rotary disk casting device or the like having the surface controlled to the similar surface roughness as mentioned above.

In the method of the present invention, the mixture of the starting metal materials may be melted, for example, by a vacuum melting method, a high frequency melting method, or the like method, preferably using a crucible in an inert gas atmosphere.

In the method of the present invention, the cooling at the supercooling degree and the cooling rate as mentioned above may be carried out by supplying, preferably continuously supplying the alloy melt onto a single roll or double rolls having the above surface roughness of a roll casting device, and cooling the alloy melt so that the thickness of the master alloy to be obtained is within the range of from 0.1 to 2.0 mm. In this case, a grinder or the like for giving the above predetermined surface roughness to the roll surface may be disposed in contact with the roll surface at a desired position on the roll surface of the roll casting device in order to maintain the roll surface at the constant surface roughness at all times with the rotation of the roll. In this way, the desired alloy can be obtained continuously, and thus being industrially advantageous.

In sum, according to the present invention, a hydrogen storage alloy can be prepared containing in an amount of not less than 5 volume % and less than 95 volume % thereof crystals containing not less than 2 and less than 17 antiphase boundaries extending perpendicular to the C-axis of the crystal grain per 20 nm along the C-axis, which boundaries are not recognized in crystals with $LaNi_5$ type structure in a conventional hydrogen storage alloy, by cooling a mixture of starting metal materials having the particular composition controlled to be within the range of the above composition A under cooling conditions selected from the above particular range depending on the composition using a cooling device having the particular surface roughness as mentioned above.

According to the method of the present invention, the alloy obtained by uniformly solidifying the alloy melt to have a thickness of 0.1 to 2.0 mm under the cooling conditions as mentioned above using the roll casting device having a roll with a surface roughness of 30 to 150 $\mu$m in mean maximum height ($R_{max}$) may be heated at 800° to 1000° C., preferably at 850° to 950° C. for 0.1 to 12 hours, preferably 4 to 8 hours in vacuum or an inert atmosphere to further define clearly the $LaNi_5$ type lattice and the arrangement of the antiphase boundaries, and to relieve lattice strain, thereby obtaining a hydrogen storage alloy with improved hydrogen storage capacity. With this process, segregation of the M element in the formula (1) such as Co, Al, Mn, or the like is also cleared to form a uniform structure, and the expansion and contraction of the lattice upon absorption and desorption of hydrogen (charging and discharging) become even, so that cracks are hardly formed in the alloy. As a result, an alloy can be obtained wherein decrepitation of the alloy is restrained, and when the alloy is used for an anode of a nickel-hydrogen rechargeable battery, the battery life is improved. It is preferred to maintain the temperature of such heating within the controlled range of ±10° C., and the heating can be carried out in an ordinary heat treatment furnace or the like. The alloy to be subjected to the heating may be in the form as obtained, or may be coarsely crushed, or pulverized into powders before subjecting to the heating. The alloy undergone the above heat treatment may be processed through an ordinary crushing, pulverizing, or other process to obtain hydrogen storage alloy powders.

The anode for a nickel-hydrogen rechargeable battery of the present invention contains as an anode material the above hydrogen storage alloy and an electrically conductive material.

The hydrogen storage alloy is used preferably in the form of a pulverized material with 20 to 100 $\mu$m pulverized particle size, more preferably 40 to 50 $\mu$m uniform particle size. The pulverization may be carried out by coarsely crushing the above alloy by a stamp mill or the like, and then mechanically pulverizing the obtained alloy particles by a planetary ball mill or the like device in a non-acidifying solvent such as hexane. The content of the alloy is 70 to 95 % by weight, preferably 80 to 90 % by weight of the total weight of the anode material. If the content of the alloy is less than 70 % by weight, the hydrogen storage capacity of the anode to be obtained becomes low, and high capacity is hardly achieved, thus not being preferred. On the other hand, if the content of the alloy is more than 95 % by weight, the electrical conductivity is decreased, and durability is impaired, thus not being preferred.

Examples of the electrically conductive material may include copper, nickel, cobalt, and the like. The electrically conductive material may be used in the form of powders with the particle size of about 1 to 10 $\mu$m. The content of the electrically conductive material is preferably 5 to 20 % by weight, more preferably 10 to 20 % by weight.

The anode for a nickel-hydrogen rechargeable battery of the present invention may contain a binder in addition to the above requisite components. Preferred examples of the binder may include an ethylene tetrafluoridepropylene hexafluoride copolymer (FEP), polytetrafluoroethylene, carboxymethyl cellulose, or the like. The content of the binder is preferably less than 10 % by weight of the total weight of the anode material.

The anode for a nickel-hydrogen rechargeable battery of the present invention may be prepared, for example, by binding the anode material on a collector body of a conductive material such as nickel mesh, nickel or copper expanded metal, nickel or copper punched metal, foamed nickel, and woolen nickel. The binding may be carried out by a rolling press method, a molding press method, or the like, into the form of preferably a sheet or a pellet. The obtained anode can be used in the same way as an anode for an ordinary nickel-hydrogen rechargeable battery to produce a rechargeable battery.

Since the hydrogen storage alloy of the present invention has the particular composition, and includes in the amount of not less than 5 volume % and less than 95 volume % thereof the crystals containing not less than 2 and less than 17 antiphase boundaries extending perpendicular to C-axis of a grain of the crystal per 20 nm along the C-axis, when the alloy is used for an anode material for a nickel-hydrogen rechargeable battery, high initial activity, high electrical capacity, and long battery life can be achieved at the same time. Further, according to the method of the present invention, such hydrogen storage alloy can be obtained practically and easily in an industrial scale.

Further, the anode for a nickel-hydrogen rechargeable battery of the present invention exhibits high initial activity, high electrical capacity, and long battery life at the same time, and thus is expected to be demanded in place of a conventional anode.

EXAMPLES

The present invention will now be explained in more detail with reference to Examples and Comparative Examples, but the present invention is not limited thereto.

Example 1

A mixture of starting metal materials was prepared so that the composition of the mixture was 8.4 parts by weight of La, 16.8 parts by weight of Ce, 1.7 parts by weight of Pr, 6.9 parts by weight of Nd, 45.4 parts by weight of Ni, 12.8 parts by weight of Co, 6.7 parts by weight of Mn, 1.3 parts by weight of Al, and 0.27 parts by weight of Fe. The mixture was then melted in an argon atmosphere by a high frequency induction furnace to obtain an alloy melt. The temperature of the alloy melt was set at 1450° C., and the alloy melt was formed into an alloy in the form of a ribbon with the thickness of 0.3 to 0.4 mm under the conditions of the supercooling degree of 150° C. and the cooling rate of 2000° to 5000° C./sec. using a casting device having a single roll (the surface roughness of the single roll, i.e. a water-cooled copper roll, was 100 μm in the mean maximum height ($R_{max}$)) The composition of the obtained alloy in terms of atomic ratio is shown in Table 1.

Figure 2:
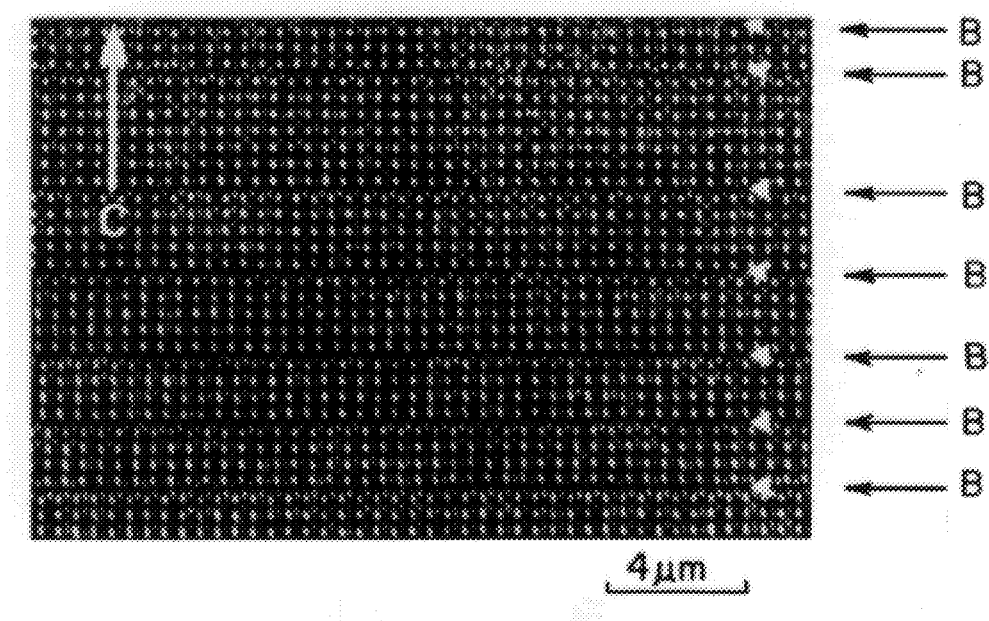
FIG. 2 is a photograph of the portion A in FIG. 1 taken under higher magnification by a high-resolution transmission electron microscope for determining the number of the antiphase boundaries contained in the crystal grains in an ingot in the form of a ribbon prepared in Example 1.

X-ray diffraction pattern of powders of the obtained alloy was determined by a X-ray diffraction apparatus manufactured by RIGAKU CORPORATION to identify that the crystals of the alloy had the $LaNi_5$ type single-phase structure. Further, the (100) plane of a crystal grain of the alloy was observed with a high-resolution transmission electron microscope (JEL4000EX) manufactured by JOEL LTD. to determine the number of the antiphase boundaries extending perpendicular to the C-axis of the crystal grain per 20 nm, and the ratio of the crystal grains containing the antiphase boundaries included in the alloy. The results are shown in Table 2. The photograph taken with the microscope used for determining the ratio of the crystal grains containing the antiphase boundaries is shown in FIG. 1, and the photograph taken with the microscope used for determining the number of the antiphase boundaries extending perpendicular to the C-axis of the crystal grain per 20 nm is shown in FIG. 2. In the figures, A refers to a portion corresponding to the enlarged photograph in FIG. 2, B refers to the antiphase boundary, and C refers to the C-axis of a crystal grain.

Subsequently, the hydrogen storage capacity and the hydrogen storage pressure of the alloy were measured using an automated Sieverts-type PCT measuring apparatus manufactured by LESCA CO., LTD. according to JIS H7201 (1991) "Method for Measuring Pressure-Composition Diagram (PCT curve) of Hydrogen Storage Alloy". The results are shown in Table 2.

Next, the alloy was coarsely crushed by a stamp mill, and further pulverized by a planetary ball mill in a hexane solvent into particles of the average particle size of 80 μm. 10 g of the obtained alloy powders, 1 g of copper powders as an electrically conductive material, and 0.3 g of FEP powders (ethylene tetrafluoride-propylene hexafluoride copolymer) as a binder were mixed together to produce a pellet electrode with 20 mm diameter. The obtained electrode was immersed in a 6N KOH solution to form a battery using a mercury oxide reference electrode, and the electrode characteristics were determined with a potentiogalvanostat (manufactured by HOKUTO DENKO CORPORATION). The results are shown in Table 2.

The initial activity and the battery life were measured on the basis of the point where the battery capacity reached the constant level after repeated charging and discharging. The battery life was determined by comparing the capacity at 100 cycle with the capacity at the constant level.

Example 2

A hydrogen storage alloy was produced in the same way as in Example 1 except that the alloy in the form of a ribbon prepared in Example 1 was heated at 900° C. for 4 hours in an argon gas stream. The obtained hydrogen storage alloy and a battery produced with this alloy ingot in the same way as in Example 1 were subjected to the same measurements as in Example 1. The results are shown in Table 2.

Comparative Example 1

A mixture of starting metal materials having the composition as shown in Table 1 was melted in the same way as in Example 1 to obtain an alloy melt. Then the obtained alloy melt was poured into a water-cooled copper mold with the temperature of the alloy melt being set at 1450° C., thereby producing an alloy ingot with the thickness of 20 mm according to a metal mold casting method. In this case, the supercooling degree was about 30° C., and the cooling rate varied over the thickness of the alloy ingot within the range of 10° to 500° C. The alloy ingot was placed in a heat treatment furnace, and heated at 1000° C. for 8 hours in an argon gas stream. The obtained heated alloy ingot is a currently used hydrogen storage alloy for a nickel-hydrogen rechargeable battery. The alloy ingot and a battery produced with this alloy ingot in the same way as in Example 1 were subjected to the same measurements as in Example 1. The results are shown in Table 2.

Examples 3 to 10

Hydrogen storage alloys were produced in the same way as in Example 1 except that the mixture of the starting metal materials for each alloy was prepared so that the mixture has the composition as shown in Table 1, respectively. The obtained alloys and batteries produced with each of the alloys were subjected to the same measurements as in Example 1. The results are shown in Table 2.

Example 11

An alloy in the form of a ribbon was produced in the same way as in Example 3 except that the single roll used was replaced by a single roll having the surface roughness of 60 μm in the mean maximum height ($R_{max}$), and subsequently the obtained alloy in the form of a ribbon was heated at 900° C. for 4 hours in an argon gas stream to obtain a hydrogen storage alloy. The obtained hydrogen storage alloy and a battery produced with the alloy in the same way as in Example 1 were subjected to the same measurements as in Example 1. The results are shown in Table 2.

Example 12

An alloy in the form of a ribbon was produced in the same way as in Example 4 except that the single roll used was replaced by a single roll having the surface roughness of 120 μm in the mean maximum height ($R_{max}$), and subsequently the obtained alloy in the form of a ribbon was heated at 900° C. for 4 hours in an argon gas stream to obtain a hydrogen storage alloy. The obtained hydrogen storage alloy and a battery produced with the alloy in the same way as in Example 1 were subjected to the same measurements as in Example 1. The results are shown in Table 2.

Comparative Example 2

A hydrogen storage alloy was produced in the same way as in Example 1 except that the mixture of the starting metal materials for the alloy was prepared so that the mixture has the composition as shown in Table 1. The value of x in the formula (1) for this alloy was 5.02 which was outside the range defined in the present invention. The obtained alloy and a battery produced with this alloy were subjected to the same measurements as in Example 1. The results are shown in Table 2.

Comparative Example 3

A hydrogen storage alloy was produced in the same way as in Example 1 except that the single roll used was replaced by a single roll having the surface roughness of 5 μm in the mean maximum height ($R_{max}$). The obtained hydrogen storage alloy and a battery produced with this alloy in the same way as in Example 1 were subjected to the same measurements as in Example 1. The results are shown in Table 2.

Comparative Example 4

A hydrogen storage alloy was produced in the same way as in Example 2 except that the single roll used was replaced by a single roll having the surface roughness of 5 μm in the mean maximum height ($R_{max}$). The obtained hydrogen storage alloy and a battery produced with this alloy in the same way as in Example 1 were subjected to the same measurements as in Example 1. The results are shown in Table 2.

TABLE 1

| | Composition of Alloy (atomic ratio) | | | | | | | | | | | | | | | Total of R | Total of M value of y | Ni + M value of x |
|---|---|---|---|---|---|---|---|---|---|---|---|---|---|---|---|---|---|---|
| | Group of R Elements | | | | | Group of M Elements | | | | | | | | | | | | |
| | La | Ce | Pr | Nd | Ni | Al | Co | Mn | Fe | Ti | Cu | Zr | B | Mo | W | | | |
| Example 1 | 0.25 | 0.50 | 0.05 | 0.20 | 3.20 | 0.20 | 0.90 | 0.50 | 0.02 | | | | | | | 1 | 1.62 | 4.82 |
| Example 2 | 0.25 | 0.50 | 0.05 | 0.20 | 3.20 | 0.20 | 0.90 | 0.50 | 0.02 | | | | | | | 1 | 1.62 | 4.82 |
| Example 3 | 0.25 | 0.50 | 0.05 | 0.20 | 2.52 | 0.16 | 0.71 | 0.39 | 0.02 | | | | | | | 1 | 1.28 | 3.80 |
| Example 4 | 0.25 | 0.50 | 0.05 | 0.20 | 2.82 | 0.18 | 0.79 | 0.44 | 0.02 | | | | | | | 1 | 1.43 | 4.25 |
| Example 5 | 0.25 | 0.50 | 0.05 | 0.20 | 3.46 | 0.19 | 0.77 | 0.38 | 0.02 | | | | | | 0.03 | 1 | 1.39 | 4.85 |
| Example 6 | 0.25 | 0.50 | 0.05 | 0.20 | 3.20 | 0.20 | 0.88 | 0.49 | 0.02 | | | | | 0.03 | | 1 | 1.62 | 4.82 |
| Example 7 | 0.25 | 0.50 | 0.05 | 0.20 | 3.20 | 0.20 | 0.88 | 0.49 | 0.02 | | | | 0.03 | | | 1 | 1.62 | 4.82 |
| Example 8 | 0.25 | 0.50 | 0.05 | 0.20 | 3.20 | 0.20 | 0.88 | 0.49 | 0.02 | | | 0.03 | | | | 1 | 1.62 | 4.82 |
| Example 9 | 0.25 | 0.50 | 0.05 | 0.20 | 3.20 | 0.20 | 0.88 | 0.49 | 0.02 | | 0.03 | | | | | 1 | 1.62 | 4.82 |
| Example 10 | 0.25 | 0.50 | 0.05 | 0.20 | 3.20 | 0.20 | 0.88 | 0.49 | 0.02 | 0.03 | | | | | | 1 | 1.62 | 4.82 |
| Example 11 | 0.25 | 0.50 | 0.05 | 0.20 | 2.52 | 0.16 | 0.71 | 0.39 | 0.02 | | | | | | | 1 | 1.28 | 3.80 |
| Example 12 | 0.25 | 0.50 | 0.05 | 0.20 | 2.82 | 0.18 | 0.79 | 0.44 | 0.02 | | | | | | | 1 | 1.43 | 4.25 |
| Comp. Ex. 1 | 0.25 | 0.50 | 0.05 | 0.20 | 3.20 | 0.20 | 0.90 | 0.50 | 0.02 | | | | | | | 1 | 1.62 | 4.82 |
| Comp. Ex. 2 | 0.25 | 0.50 | 0.05 | 0.20 | 3.60 | 0.20 | 0.80 | 0.40 | 0.02 | | | | | | | 1 | 1.42 | 5.02 |
| Comp. Ex. 3 | 0.25 | 0.50 | 0.05 | 0.20 | 3.20 | 0.20 | 0.90 | 0.50 | 0.02 | | | | | | | 1 | 1.62 | 4.82 |
| Comp. Ex. 4 | 0.25 | 0.50 | 0.05 | 0.20 | 3.20 | 0.20 | 0.90 | 0.50 | 0.02 | | | | | | | 1 | 1.62 | 4.82 |

R, M, x, and y in Table 1 correspond to those in the formula (1), respectively.

TABLE 2

| | Antiphase Boundaries | | | PCT characteristics | | Battery Characteristics | | |
|---|---|---|---|---|---|---|---|---|
| | Number of Antiphase Boundaries Extending Perpendicular to C-Axis in Crystal Grain @ (Number /20 nm) | Ratio of Crystal Grains Satisfying $2 \leq @ < 17$ in Alloy (volume %) | Crystal Structure | Hydrogen Storage Capacity 30° C. (H/M) | Hydrogen Storage Pressure 30° C. ($\times 10^{-1}$ atm) | Battery Capacity (mAh/g) | Maintained Capacity at 100 Cycle (%) | Initial Activity (Cycle) |
| Example 1 | 7~13 | 10 | LaNi$_5$ Type | 0.97 | 2.3 | 280 | 92 | 3 |
| Example 2 | 9~11 | 8 | LaNi$_5$ Type | 0.99 | 2 | 290 | 95 | 4 |
| Example 3 | 8~10 | 50 | LaNi$_5$ Type | 1.05 | 1.5 | 330 | 90 | 5 |
| Example 4 | 10~13 | 30 | LaNi$_5$ Type | 1.01 | 1.8 | 310 | 90 | 5 |
| Example 5 | 3~10 | 15 | LaNi$_5$ Type | 0.98 | 2.3 | 285 | 95 | 3 |

TABLE 2-continued

| | Antiphase Boundaries | | | PCT characteristics | | Battery Characteristics | | |
|---|---|---|---|---|---|---|---|---|
| | Number of Antiphase Boundaries Extending Perpendicular to C-Axis in Crystal Grain @ (Number /20 nm) | Ratio of Crystal Grains Satisfying $2 \leq @ < 17$ in Alloy (volume %) | Crystal Structure | Hydrogen Storage Capacity 30° C. (H/M) | Hydrogen Storage Pressure 30° C. ($\times 10^{-1}$atm) | Battery Capacity (mAh/g) | Cell Life Rate of Maintained Capacity at 100 Cycle (%) | Initial Activity (Cycle) |
| Example 6 | 5~12 | 7 | LaNi$_5$ Type | 0.99 | 2.2 | 279 | 92 | 3 |
| Example 7 | 4~11 | 15 | LaNi$_5$ Type | 0.97 | 2.3 | 281 | 91 | 4 |
| Example 8 | 3~9 | 20 | LaNi$_5$ Type | 0.98 | 2.3 | 282 | 90 | 4 |
| Example 9 | 2~7 | 13 | LaNi$_5$ Type | 0.98 | 2.2 | 283 | 90 | 4 |
| Example 10 | 4~12 | 18 | LaNi$_5$ Type | 0.98 | 2.2 | 278 | 91 | 4 |
| Example 11 | 8~9 | 50 | LaNi$_5$ Type | 1.06 | 1.4 | 360 | 95 | 5 |
| Example 12 | 11~12 | 30 | LaNi$_5$ Type | 1.02 | 1.7 | 320 | 95 | 5 |
| Comp. Ex. 1 | 0 | 0 | LaNi$_5$ Type Ce$_2$Ni$_7$ Type | 0.78 | 2.2 | 268 | 80 | 6 |
| Comp. Ex. 2 | 0 | 0 | LaNi$_5$ Type | 0.78 | 2.6 | 265 | 90 | 7 |
| Comp. Ex. 3 | 0~1 | <5 | LaNi$_5$ Type Ce$_2$Ni$_7$ Type | 0.95 | 2.3 | 260 | 80 | 6 |
| Comp. Ex. 4 | 0~1 | <5 | LaNi$_5$ Type Ce$_2$Ni$_7$ Type | 0.95 | 2.3 | 260 | 80 | 6 |

What is claimed is:

1. A rare earth metal-nickel hydrogen storage alloy consisting essentially of the formula (1)

$$RNi_{x-y}M_y \qquad (1)$$

wherein R stands for La, Ce, Pr, Nd, or mixtures thereof, M stands for Co, Al, Mn, Fe, Cu, Zr, Ti, Mo, Si, V, Cr, Nb, Hf, Ta, W, B, C, or mixtures thereof, x satisfies the formula of $3.5 \leq x < 5$, and y satisfies the formula of $1 < y \leq 2$, crystals in said alloy consisting of a LaNi$_5$ single phase structure, said alloy including in an amount of not less than 5 volume % and less than 95 volume % thereof crystals each containing not less than 2 and less than 17 antiphase boundaries extending perpendicular to C-axis of a grain of said crystal in the alloy per 20 nm along the C-axis.

2. The hydrogen storage alloy of claim 1 wherein x and y in the formula (1) satisfy the formulae of $3.8 \leq x \leq 4.9$ and $1.0 \leq y \leq 1.8$, respectively.

3. A method for producing the rare earth metal-nickel hydrogen storage alloy of claim 1 comprising the step of uniformly solidifying an alloy melt consisting essentially of a composition represented by the formula (1):

$$RNi_{x-y}M_y \qquad (1)$$

wherein R stands for La, Ce, Pr, Nd, or mixtures thereof, M stands for Co, Al, Mn, Fe, Cu, Zr, Ti, Mo, Si, V, Cr, Nb, Hf, Ta, W, B, C, or mixtures thereof, x satisfies the formula of $3.5 \leq x < 5$, and y satisfies the formula of $0 < y \leq 2$, to have a thickness of 0.1 to 2.0mm under cooling conditions wherein a supercooling degree is 50° to 500° C. and a cooling rate is 1000° to 10000° C./sec. using a roll casting device having a roll with a surface roughness of 30 to 150 μm in mean maximum height, R$_{max}$.

4. The method of claim 3 further comprising the step of, after uniformly solidifying said alloy melt to have a thickness of 0.1 to 2.0 mm under said cooling conditions using the roll casting device having the roll with the surface roughness of 30 to 150 μm in the mean maximum height, R$_{max}$, heating a solidified alloy at 800° to 1000° C. for 0.1 to 12 hours in vacuum or in an inert atmosphere.

5. The method of claim 3 or 4 wherein the mean maximum height, R$_{max}$ is 60 to 120 μm.

6. An anode for a nickel-hydrogen rechargeable battery containing as an anode material the rare earth metal-nickel hydrogen storage alloy of claim 1 and an electrically conductive material.

7. The anode for a nickel-hydrogen rechargeable battery of claim 6 wherein the rare earth metal-nickel hydrogen storage alloy is in a form of powders with a particle size of 20 to 100 μm.

8. The anode for a nickel-hydrogen rechargeable battery of claim 6 wherein a content of said rare earth metal-nickel hydrogen storage alloy is 70 to 95 % by weight of said anode material, and a content of said electrically conductive material is 5 to 20 % by weight of said anode material.

* * * * *